(12) United States Patent
Hartikainen et al.

(10) Patent No.: US 8,849,961 B2
(45) Date of Patent: Sep. 30, 2014

(54) MOBILE NETWORK OPTIMIZED METHOD FOR KEEPING AN APPLICATION IP CONNECTION ALWAYS ON

(75) Inventors: Rauno Hartikainen, Espoo (FI); Pertti Kasanen, Helsinki (FI); Mika Joutsenvirta, Tampere (FI)

(73) Assignee: Nokia Corporation, Espoo (FI)

( * ) Notice: Subject to any disclaimer, the term of this patent is extended or adjusted under 35 U.S.C. 154(b) by 784 days.

(21) Appl. No.: 11/516,922

(22) Filed: Sep. 6, 2006

(65) Prior Publication Data

US 2008/0059582 A1 Mar. 6, 2008

(51) Int. Cl.
*G06F 15/177* (2006.01)
*H04L 29/08* (2006.01)
*H04L 29/06* (2006.01)

(52) U.S. Cl.
CPC ........... *H04L 67/14* (2013.01); *H04L 69/24* (2013.01)
USPC ............ 709/220; 709/204; 709/232; 370/229

(58) Field of Classification Search
USPC ............................ 709/220, 204, 232; 370/229
See application file for complete search history.

(56) References Cited

U.S. PATENT DOCUMENTS

| | | | |
|---|---|---|---|
| 6,212,175 B1 * | 4/2001 | Harsch | 370/338 |
| 6,405,262 B1 * | 6/2002 | Vogel et al. | 719/315 |
| 6,697,354 B1 | 2/2004 | Borella et al. | |
| 6,976,071 B1 | 12/2005 | Donzis et al. | |
| 6,981,048 B1 | 12/2005 | Abdolbaghian et al. | |
| 7,266,591 B1 * | 9/2007 | Johnston | 709/219 |
| 8,045,491 B1 * | 10/2011 | Bishara et al. | 370/287 |

(Continued)

FOREIGN PATENT DOCUMENTS

| | | |
|---|---|---|
| EP | 1 294 145 A2 | 3/2003 |
| EP | 1622400 | 2/2006 |

(Continued)

OTHER PUBLICATIONS

Gunaratne et al., Managing energy consumption costs in desktop PCs and LAN switches with proxying, split TCP connections, and scaling of link speed, 2005, International Journal of Network Management Int. J. Network Mgmt 2005; 15: 297-310, Published online in Wiley InterScience (www.interscience.wiley.com). pp. 1-14.*

(Continued)

Primary Examiner — Harunur Rashid
(74) Attorney, Agent, or Firm — Banner & Witcoff, Ltd.

(57) ABSTRACT

A system and method of maintaining an always-on application client communication is provided. An application programming interface implemented on a device hosting an always-on application client determines if network-based keep-alive functionality exists in a network where the device operates. If network-based keep-alive functionality exists, a network element is instructed to transmit keep-alive messages to the application server on behalf of the device. The network element can be implemented in or as a variety of existing network elements, e.g., as a GPRS gateway serving node or a standalone keep-alive network element. Alternatively, an application server communicatively connected to the always-on application client may query whether network-based keep-alive functionality exists. If network-based keep-alive functionality exists, the application server negotiates with the always-on application client to determine an application-specific mechanism for implementing the network-based keep-alive functionality. When an application server queries for network-based keep-alive functionality, an application programming interface need not be utilized.

22 Claims, 8 Drawing Sheets

(56) References Cited

U.S. PATENT DOCUMENTS

| | | | |
|---|---|---|---|
| 2002/0052204 A1* | 5/2002 | Bender et al. | 455/450 |
| 2003/0084161 A1* | 5/2003 | Watson et al. | 709/227 |
| 2004/0005045 A1* | 1/2004 | Adams et al. | 379/201.02 |
| 2004/0202117 A1* | 10/2004 | Wilson et al. | 370/310 |
| 2005/0188098 A1* | 8/2005 | Dunk | 709/232 |
| 2006/0002358 A1* | 1/2006 | Ray et al. | 370/342 |
| 2006/0018290 A1* | 1/2006 | Zhao | 370/335 |
| 2007/0168336 A1* | 7/2007 | Ransil et al. | 707/3 |
| 2009/0135837 A1* | 5/2009 | Mohaban | 370/400 |

FOREIGN PATENT DOCUMENTS

| | | | |
|---|---|---|---|
| FI | 20065041 | * | 1/2006 |
| WO | 03/067447 A1 | | 8/2003 |
| WO | WO 2007/083000 | | 7/2007 |

OTHER PUBLICATIONS

Huttunen et al, UDP Encapsulation of IPsec ESP Packets, Network Working Group, Request for Comments:3948, Category: Standards Track, The Internet Society, Jan. 2005.

Levkowetz et al., Mobile IP Traversal of Network Address Translation (NAT) Devices, Network Working Group, Request for Comments:3519, Category: Standards Track, The Internet Society, Apr. 2003.

International Search Report for PCT Application PCT/IB2007/053320.

European Application No. 07 82 6064—Supplementary European Search Report dated Feb. 28, 2013.

* cited by examiner

MOBILE NETWORK OPTIMIZED METHOD FOR KEEPING AN APPLICATION IP CONNECTION ALWAYS ON

FIELD OF THE INVENTION

The present invention relates generally to keep alive messaging in IP networks. In particular, the present invention relates to a system and method of allowing an IP network entity to transmit keep alive messages on behalf of a communications terminal.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Data networks have become commonplace in today's world, allowing for various types of communications including e-mail, instant messaging, web browsing, voice, interactive and multimedia communications, etc. In the various types of data communications, it is important to maintain connections between an application server or service provider entity located on a data network and a communication device, such as a personal computer (PC) or a networked workstation as communications may occur at any time. This is in contrast more traditional telecommunications scenarios where an incoming call is detected on a dedicated line, connected, and released upon completion of the communication.

To maintain "always-on" connections, communication devices generally employ or have integrated therein, applications that send static or random data to application servers just to keep the connection open. Usually, this static or random data comprises a small static package sent every 30 seconds, for example. In a wired or "fixed power" environment, this transmission of random data is generally not a concern. However, in mobile environments the constant transmission of such data poses a major problem in that the battery life of a mobile device is constantly being depleted during each random data transmission. This promotes bad battery performance, as the mobile device has to maintain a constant or at least a periodic connection to a mobile station or application server. The problem is exacerbated when a single mobile device has multiple connections to multiple application servers, where connection maintenance is performed separately for each application server, because different applications may have different timing mechanisms for keep-alive messaging. Therefore, less battery life is available for actual communications in this situation. In conventional systems, always-on applications are implemented on mobile devices as a basic requirement for maintaining the constant connection between the mobile device and an application server in the network. In addition, there are generally several network components between the mobile device and the application server.

Low-level Internet Protocol (IP) connections are generally short-lived. A mobile service provider can control the timeout in the service provider's core network but typically cannot control the network timeouts in connections to application servers of 3$^{rd}$ party service providers. It should be further noted that connection timeouts in a mobile core network are not different for different communication protocols. In fixed network connections to application servers, there are significant timeout differences when utilizing Universal Datagram Protocol (UDP) and Transmission Control Protocol (TCP). UDP is a protocol that does not guarantee delivery and duplicate packet protection, while TCP provides a more reliable, connection-oriented protocol that generally operates in a layered protocol hierarchy. Mobile applications can use either UDP or TCP connections.

Different types of always-on IP applications are becoming an increasingly important part of not only mobile devices, but of communication terminals in general. An application cannot necessarily trust that a connection will remain open, as it may get closed by the network due to inactivity or some other network problem. Therefore, the connection must always be kept on. As discussed above, one example is e-mail. Quite often, obtaining an e-mail connection to corporate servers is not allowed without some kind of security. Security is offered via IPsec tunneling. In addition, connections generally involve traversing a Network Address Translation (NAT) device. The process of network address translation, also known as network masquerading or IP-masquerading, involves re-writing the source and/or destination addresses of IP packets as they pass through a router or firewall.

Most systems using NAT do so in order to enable multiple hosts on a private network to access the Internet using a single public IP address. For example, a local network may use IP addresses from one of the private IP address ranges (for example, 192.168.x.x and 10.x.x.x) and use a NAT router to connect to the Internet. As terminals send traffic from the local network, the NAT router translates the local IP address to one of its own public addresses. In order to get through NAT devices, an IPsec tunnel is created using UDP encapsulation. However, as NAT mappings used in UDP traffic are relative short (i.e., 20-60 seconds), a mobile device needs to send keep-alive message quite often to keep NAT mappings active. Otherwise, responses sent to the mobile device may not be able to be routed thereto.

This frequent keep-alive message sending has various drawbacks. First, a mobile device needs to wakeup, for example, every 20 seconds to send single keep-alive message. This changes the state of the radio bearer from IDLE to ACTIVE and the mobile device will stay in the ACTIVE state for several seconds before moving back to IDLE, just to be activated again due to the next keep-alive message. This frequent state change and usage of ACTIVE state causes significant battery consumption. In fact, the mobile device is in a type of high level standby mode where it is active almost continuously, resulting in high power consumption. Another problem is seen on network side. Because mobile devices are more frequently in an ACTIVE state, they will consume more network resources and a single base station is not able to serve as many mobile devices as it could if the mobile devices were not jumping between IDLE and ACTIVE due to keep-alive messages.

Previous solutions for this problem entail sending keep-alive messages from the mobile device itself to another mobile device or application server it wishes to remain connected to. Alternatively, an application server may send keep-alive messages to the mobile device. This method of keep-alive signaling has been specified for IPsec (RFC3948), incorporated by reference herein in its entirety, and MIP (RFC3519), incorporated by reference herein in its entirety. In addition, it is the responsibility of the terminal to send such a message if a NAT device is detected in the path. Other conventional systems involve a network entity such as a network operations center sending keep-alive messages to a gateway. However, this is again done for the purpose of the network operations center, and not on the behalf of another entity, such as a mobile device.

SUMMARY OF THE INVENTION

Various embodiments of the present invention provide a system and method of maintaining an always-on application client communication between an always-on application client and an application hosted on an application server. In one embodiment of the present invention, an application programming interface implemented on a device hosting the always-on application client determines if network-based keep-alive functionality exists in a network where the device operates. If network-based keep-alive functionality exists, a network element is instructed to transmit keep-alive messages to the application server on behalf of the device. Additionally, replies to the keep-alive messages can be dropped to prevent the device from receiving the replies. In another embodiment of the present invention, the network element determines that the device is transmitting keep-alive messages to the application server. Upon this determination, the network element instructs the device to stop sending the keep-alive messages and resumes the sending of the keep-alive messages on behalf of the device. The network element can be implemented in or as a variety of existing network elements, e.g., as a GPRS gateway serving node or a standalone keep-alive network element.

Battery performance of a device hosting the always-on application client can be improved with the present invention because the device is no longer required to continuously transmit keep-alive messages to the application server. Also, the hosting device need no longer reply to keep-alive messages from an application server, or at least can transmit automated replies. Control signaling and traffic is reduced as well for both the device and supporting network elements such as base stations, allowing the supporting network elements to serve more mobile devices. In addition, implementing the various embodiments of the present invention allows service providers the freedom to focus on optimizing actual call performance instead of on keep-alive transmissions, as well as easing the burden on application developers by removing the responsibility to consider future networks and different country configurations.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF VARIOUS EMBODIMENTS

Figure 1:
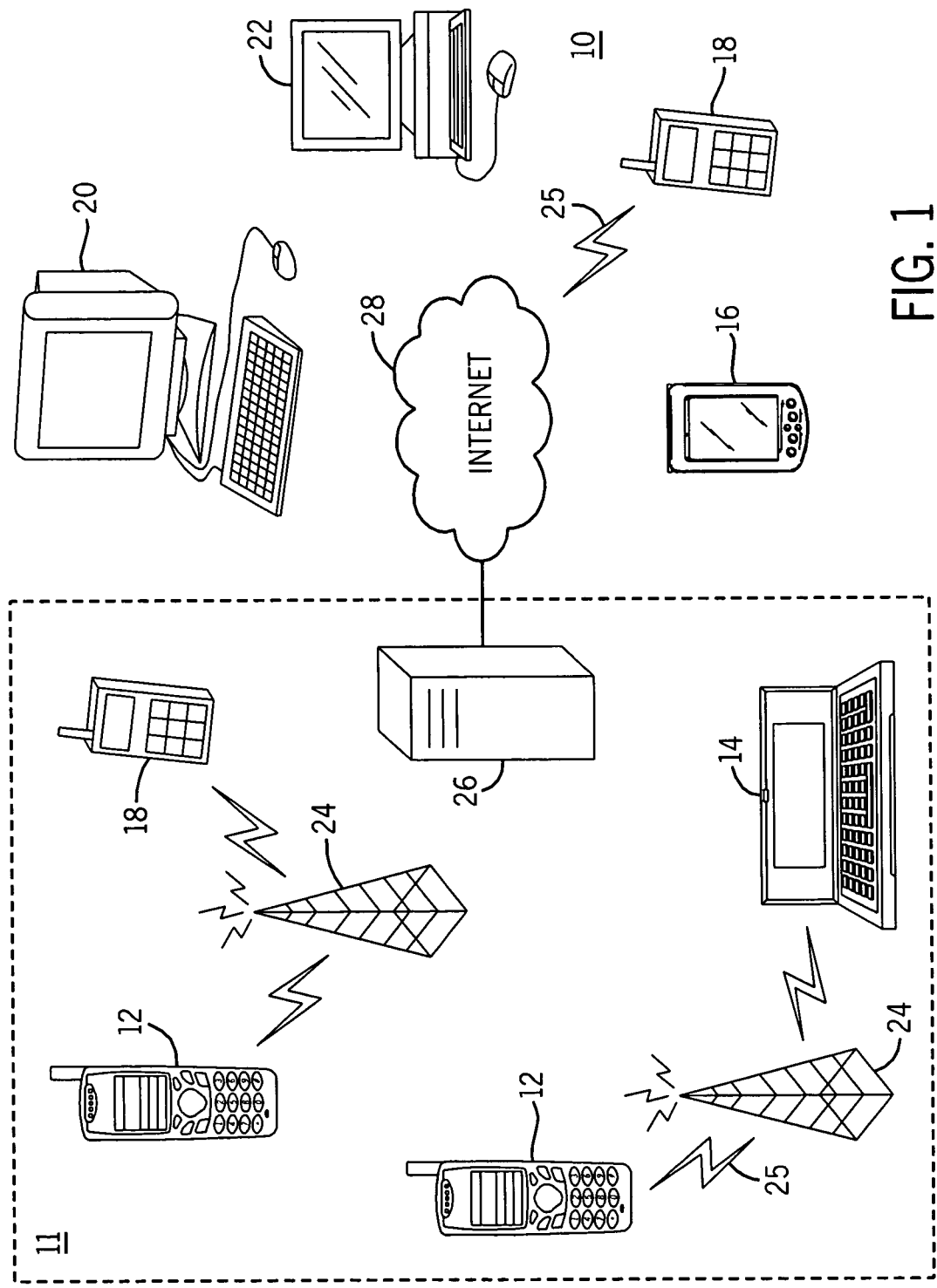
FIG. 1 is an overview diagram of a system within which the present invention may be implemented.

FIG. 1 shows a system 10 in which the present invention can be utilized, comprising multiple communication devices that can communicate through a network. The system 10 may comprise any combination of wired or wireless networks including, but not limited to, a mobile telephone network, a wireless Local Area Network (LAN), a Bluetooth personal area network, an Ethernet LAN, a token ring LAN, a wide area network, the Internet, etc. The system 10 may include both wired and wireless communication devices.

For exemplification, the system 10 shown in FIG. 1 includes a mobile telephone network 11 and the Internet 28. Connectivity to the Internet 28 may include, but is not limited to, long range wireless connections, short range wireless connections, and various wired connections including, but not limited to, telephone lines, cable lines, power lines, and the like.

The exemplary communication devices of the system 10 may include, but are not limited to, a mobile device 12, a combination PDA and mobile telephone 14, a PDA 16, an integrated messaging device (IMD) 18, a desktop computer 20, and a notebook computer 22. The communication devices may be stationary or mobile as when carried by an individual who is moving. The communication devices may also be located in a mode of transportation including, but not limited to, an automobile, a truck, a taxi, a bus, a boat, an airplane, a bicycle, a motorcycle, etc. Some or all of the communication devices may send and receive calls and messages and communicate with service providers through a wireless connection 25 to a base station 24. The base station 24 may be connected to a network server 26 that allows communication between the mobile telephone network 11 and the Internet 28. The system 10 may include additional communication devices and communication devices of different types.

The communication devices may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device may communicate using various media including, but not limited to, radio, infrared, laser, cable connection, and the like.

Figure 2:
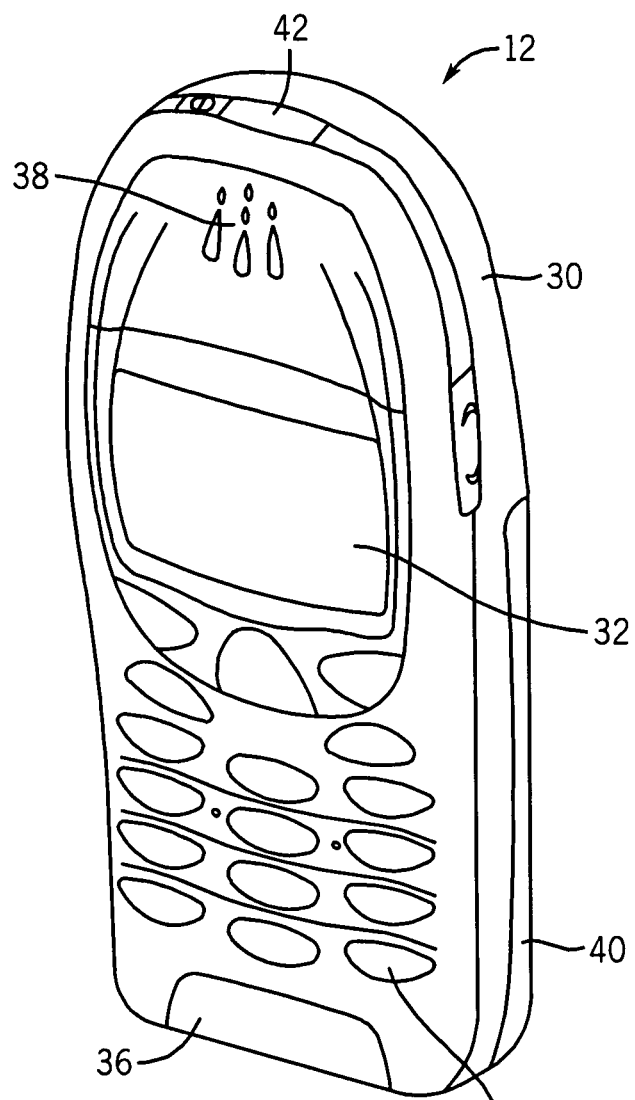
FIG. 2 is a perspective view of a mobile telephone that can be used in the implementation of the present invention.
Figure 3:
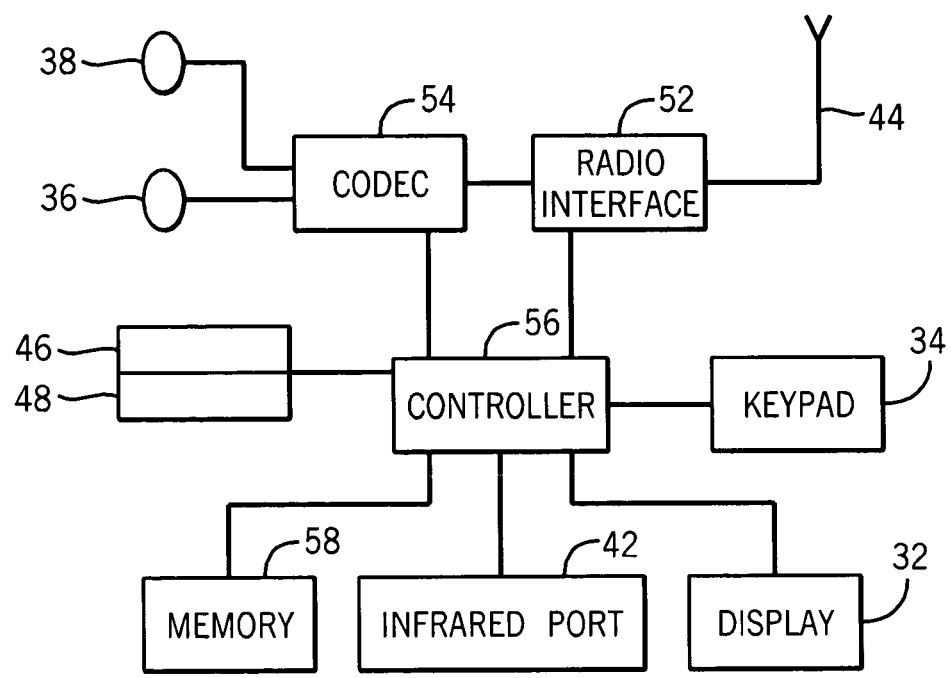
FIG. 3 is a schematic representation of the telephone circuitry of the mobile telephone of FIG. 2.

FIGS. 2 and 3 show one representative mobile device 12 within which the present invention may be implemented. It should be understood, however, that the present invention is not intended to be limited to one particular type of mobile device 12 or other electronic device. The mobile device 12 of FIGS. 2 and 3 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art, for example in the Nokia range of mobile telephones.

Various embodiments of the present invention comprise a software application programming interface (API) implemented on a mobile device. An API is an interface that a computer system, library or application provides in order to allow requests for services to be made of it by other computer programs, and/or to allow data to be exchanged therebetween. In particular, the API implemented in the various embodiments of the present invention allows for keep-alive messaging between an application client of a mobile device and an associated application server.

Figure 4:
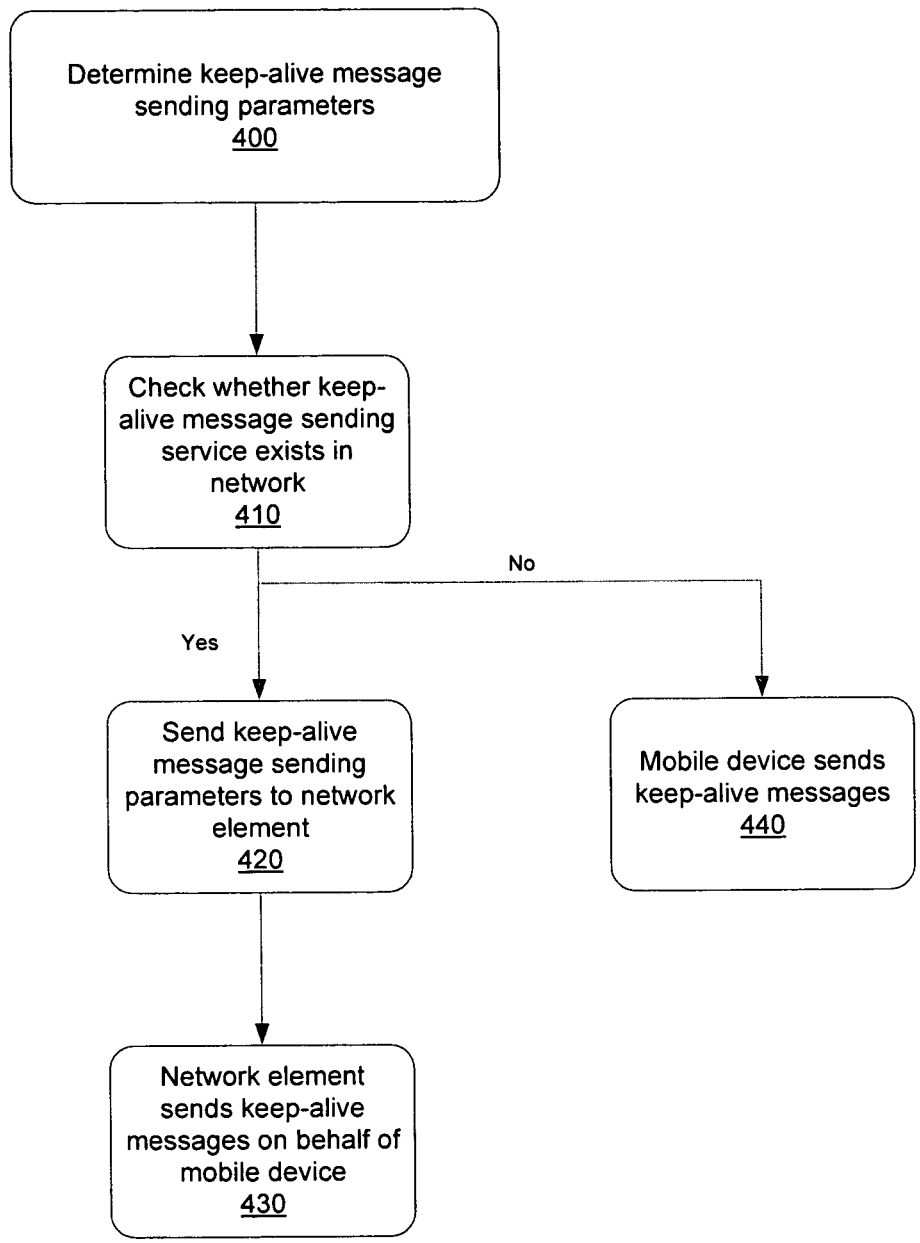
FIG. 4 is a flow chart of the processes performed in a first embodiment of the present invention.

FIG. 4 shows a flow chart describing the operation of a first embodiment of the present invention. A software API is provided which can determine various keep-alive message sending parameters at 400. The various parameters can include, but are not limited to, for example, a message sending period, a message content, and a target IP address, which can be gleaned from a mobile device. It should be noted that the message content can comprise, but is not limited to, static data, static data and random data, and parameters defining certain message content. An implementation behind the API can check if a keep-alive message sending service exists in the mobile network within which the mobile device operates at 410. If so, the keep-alive message sending parameters are given to a network element within the mobile network at 420. The network element then starts to send keep-alive messages on behalf of the mobile device at 430. It should be noted that the network element sending the keep-alive messages can be any server or other processor that can be implemented with this functionality. Furthermore, this functionality can be implemented in an existing network element within the mobile network. In the event that the mobile network does not support keep-alive message sending, the mobile device (i.e., the API and protocol stack) will send the keep-alive messages on behalf of the application client at 440.

Figure 5:
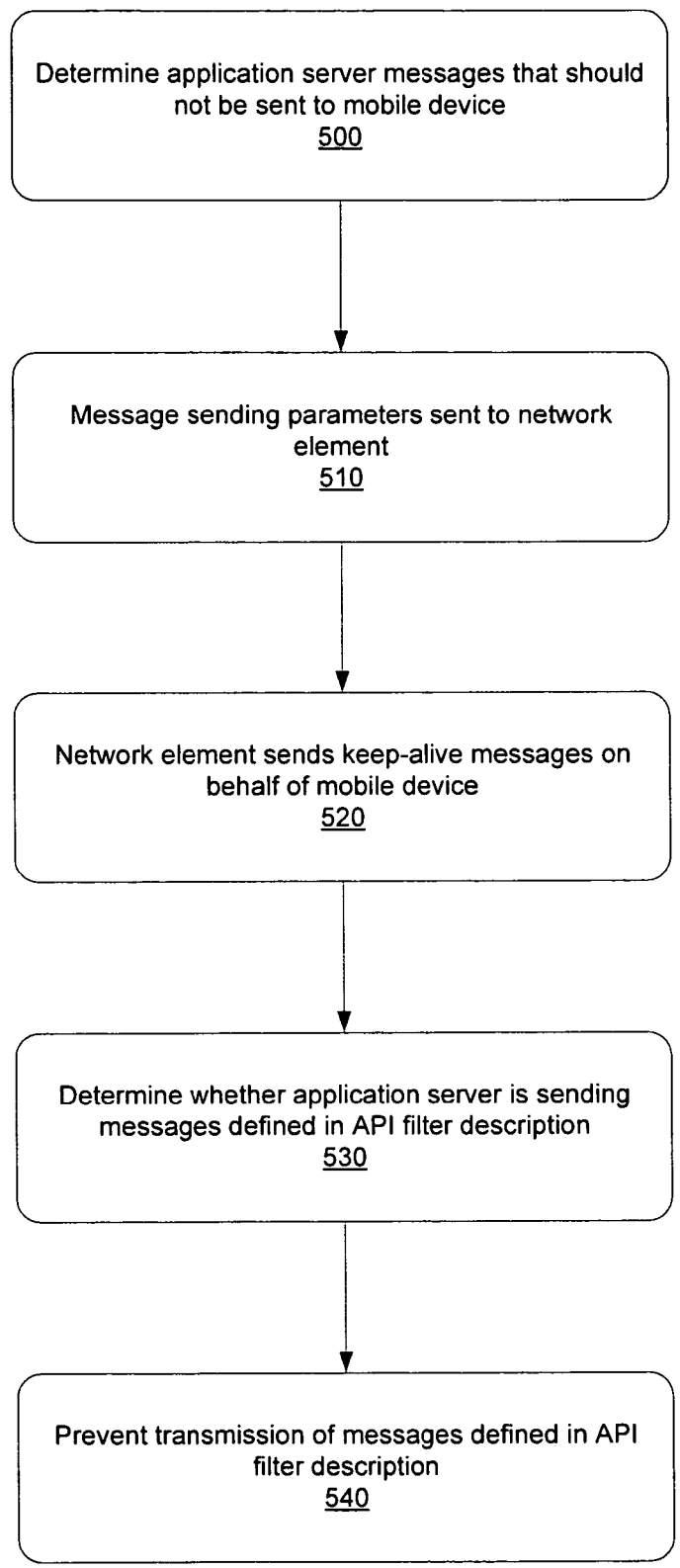
FIG. 5 is a flow chart of the processes performed in a second embodiment of the present invention.

The operation of a second embodiment of the present invention is described by the flow chart in FIG. 5. The API can optionally include a filter description which defines application server messages that should not be forwarded to the application client of the mobile device. These not-to-be forwarded application server messages are determined at 500. As before, keep-alive message sending parameters are sent to the network element at 510, and the network element sends keep-alive messages on behalf of the mobile device at 520. At 530, it is determined whether the application server is in fact sending replies to the keep-alive messages to the mobile device, where the replies are defined in the filter description. If so, at 540, transmission of these replies is prevented. It should be noted that the filter determination shown at 500 need not occur after the processes described at 510 and 520, but can be performed at any time prior to receiving at least a first keep-alive message reply. This further conserves the mobile device's battery life and resources of the mobile network. Alternatively, the application server can be configured to send the keep-alive messages, for example, after an initial negotiation with the application client. The filter feature described above can also cover application server-originated keep-alive messages by defining an automated reply message for server messages matching the filter description.

Figure 6:
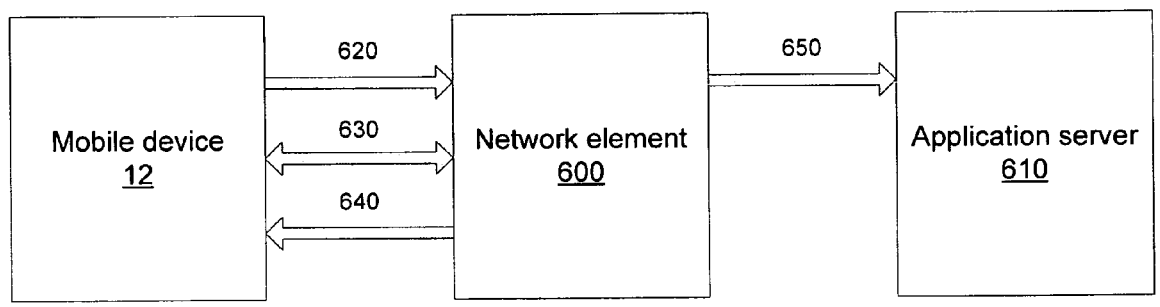
FIG. 6 shows a network architecture in which a third embodiment of the present invention can be implemented.

In a third embodiment of the present invention, a mobile device 12, a network element 600, and an application server 610 are shown in FIG. 6. It should be noted that the application server 610 can comprises, but is not limited to, a standalone server, an existing network element, and another mobile device. When the network element 600 recognizes that the mobile device 12 is sending keep-alive messages 620 to the application server 610, the network element 600 can negotiate with a filter (not shown) of the mobile device 12 as described above, to filter out the keep-alive messages. Specifically, a negotiation 630 occurs between the network element 600 and the mobile device 12, where the network element 600 provides information regarding which messages and/or message types comprise keep-alive messages. The network element 600 then transmits instructions 640 to the mobile device 12 to stop sending such messages to the network element 600. The filter of the mobile device 12 can be used to determine if any messages to-be-sent from the mobile device 12 are keep-alive messages. If so, the filter filters out those messages from the outgoing traffic of the mobile device 12. After a successful negotiation 630, the network element 600 will assume the task 650 of sending keep-alive messages to the application server 610.

Figure 7:
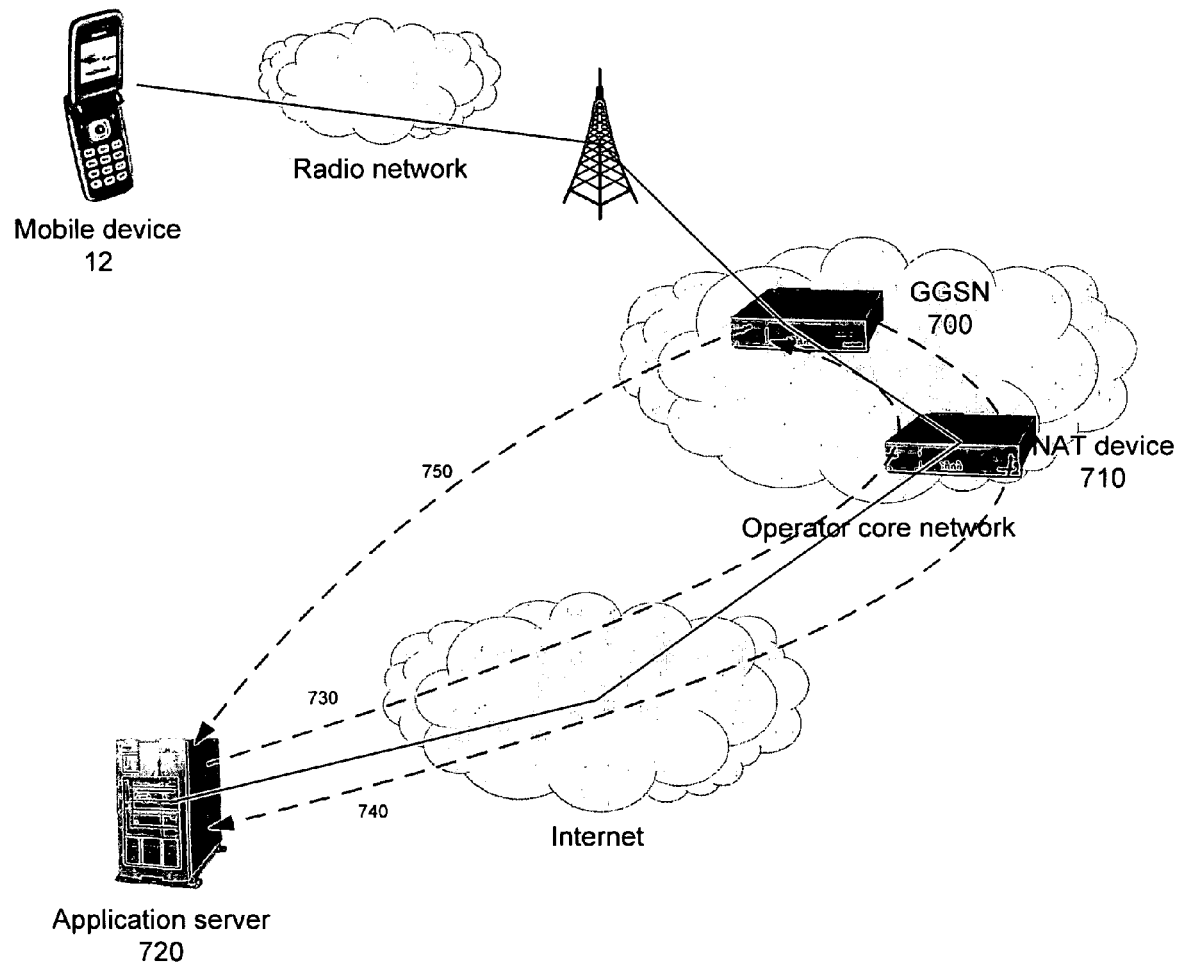
FIG. 7 shows a network architecture in which a fourth embodiment of the present invention can be implemented.

In a fourth embodiment of the present invention, keep-alive messaging is approached utilizing a server-centric approach as shown in FIG. 7, which depicts a conventional communications network in which the various embodiments of the present invention can be implemented. A mobile device 12 is shown to communicate with a GPRS Gateway Serving Node (GGSN) 700 via a radio network. A GGSN is network node that acts as a gateway between a General Packet Radio Service (GPRS) wireless data network and other networks such as the Internet or private networks. The GGSN acts as an anchor point that enables the mobility of a mobile device in GPRS/Universal Mobile Telecommunication System (UMTS) networks. In essence, the GGSN in a GPRS network is similar to of a Home Agent in Mobile IP, by maintaining any routing necessary to tunnel Protocol Data Units (PDUs) to the Serving GPRS SGSN that service a particular MS (Mobile Subscriber).

In order for an Internet-based application client of the mobile device to function, the mobile device 12 must further communicate with an application server 720 via a network address translation (NAT) device 710 and the Internet. As shown in FIG. 7, the operator core network encompasses at least the GGSN 700 and the NAT device 710. The application server 720 attempts to negotiate a keep-alive messaging function with a network element, such as the GGSN 700. If the negotiation is successful, the application client of the mobile device 12 and the application server 720 negotiate an application-specific mechanism relieving the mobile device 12 of the duty to send keep-alive messages.

Specifically, at 730, the application server 720 requests a keep-alive function from the GGSN 700, with message sending period and message content as parameters. To penetrate firewalls and NAT devices it is better that the keep-alive message comes from mobile device direction, as at 740. In this case it is not necessary for the application server 720 to send a reply to keep-alive messages, but there is an optional parameter for application server-originated, keep-alive messages that a network element such as the GGSN 700 should drop (i.e., not deliver to the mobile device 12). The parameters include also a message that the GGSN 700 should send in case the mobile device connection is terminated, such as at 750. Using this functionality instructs the GGSN 700 to not timeout this PDP context or alternatively, implements setting a timeout period different than the default GGSN 700 configuration. It should be noted that in the fourth embodiment of the present invention, a software API need not be utilized.

For certain embodiments of the present invention, to avoid Denial Of Service attacks, a network element, such as the GGSN 700, can only accept requests from application servers it knows. In addition there is a lightweight agreement process between the operator and the application service provider, as a GGSN is typically not accessible from the public internet. In a service operator's network Demilitarized Zone (DMZ), there can be a server from where the application server asks for a desired service. The operator in turn sets up a Domain Name Service (DNS) service record for this server, in the same domain from where the original application server connection comes from. The request from the application server would contain the origin IP address and port number of the application connection from mobile device as parameters.

Figure 8:
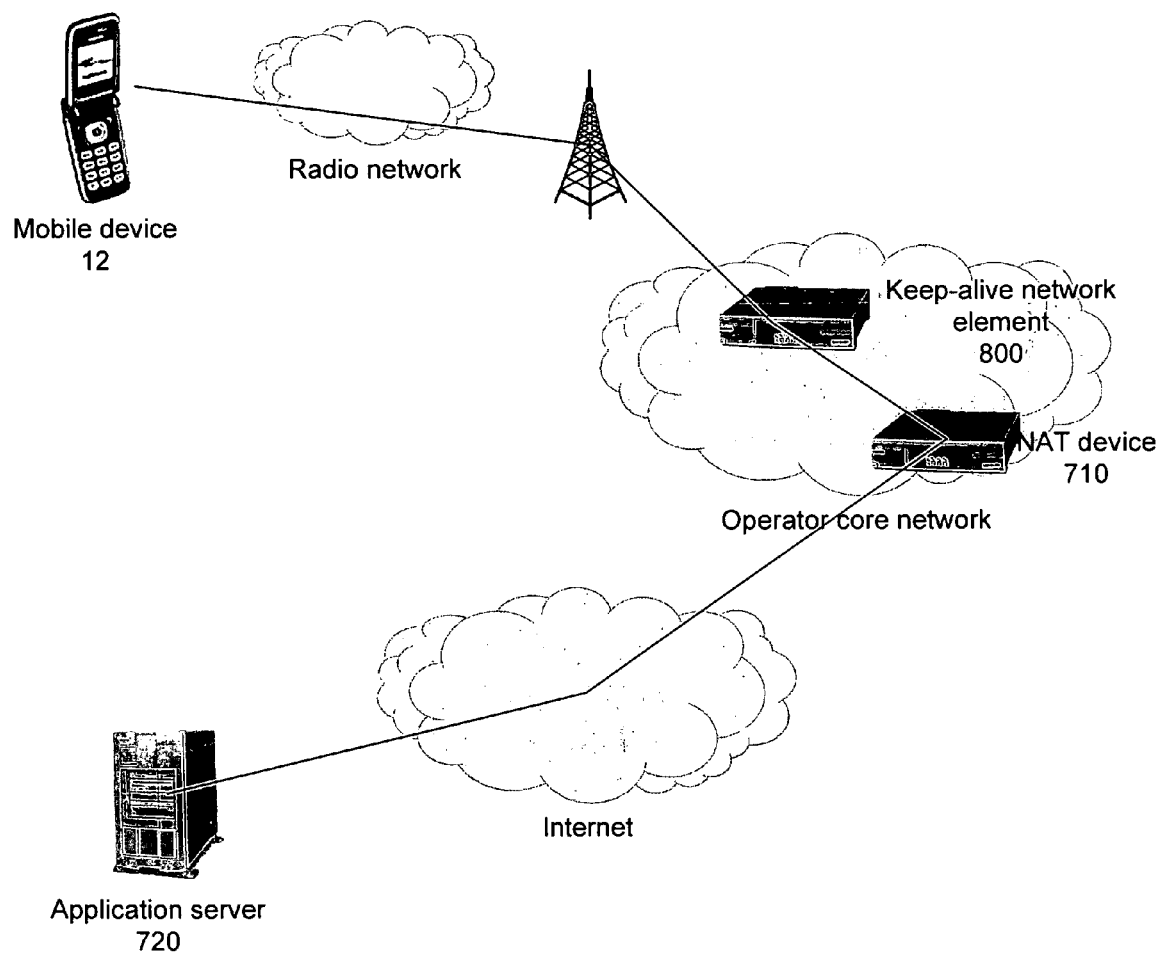
FIG. 8 shows a network architecture in which a fifth embodiment of the present invention can be implemented.

As described above, a network element such as a GGSN can be used to provide keep-alive messaging to an application server in lieu of a mobile device. FIG. 8 shows that a new keep-alive network element 800 can also be used to provide keep-alive messaging, instead of utilizing a GGSN. In this embodiment of the present invention, a network service operator can provide a service that sends NAT keep-alive messages on behalf of the mobile device 12. This new keep-alive network element 800 can be located before the first NAT device 710 and the mobile device 12 can request NAT keep-alive services from it. In addition, the new keep-alive network element 800 can learn of the keep-alive functionality by performing its own network analysis. It should be noted as well that a software API need not be utilized in this example. Another network element that can be used for the keep-alive assistance functionality is the Home Agent (not shown). As 3GPP is standardizing Mobile IP (MIP) usage for inter access mobility between 3GPP and non-3GPP systems, a network element placed before the Home Agent does not solve NAT keep-alive problem that occur after traversing the Home Agent. Therefore, MIP signaling can be used to inform a proper Home Agent to start its own keep-alive assistance functionality.

Specifically, the mobile device 12 can get the IP address of the new keep-alive network element 800 during the dynamic host configuration protocol (DHCP) procedure. The DHCP is a protocol used by network entities to obtain unique IP addresses, and other parameters like: default router, subnet mask, and IP addresses for DNS servers. This protocol is used when network entities are added to a network because these settings are necessary for the host to participiate in the network. When the mobile device 12 detects a NAT device 710 in the communication path (for example, Internet Key Exchange (IKE) specifies a mechanism to detect NAT devices), the mobile device 12 can request a NAT keep-alive service from the new keep-alive network element 800 by sending a special message to the new keep-alive network element 800. That message can contain source and destination IP/port information. The new keep-alive network element 800 then sends keep-alive messages on behalf of the mobile device 12 using the parameters received from mobile device 12.

In implementing the keep-alive features discussed above, a software API can be created on the device side, where device application developers can use the API or alternatively, application servers are made aware of mobile networks. Also, wireless network providers can implement the keep-alive features in some network components. In the case of network support being available, battery performance of a mobile device can be improved as result of reduction in traffic over the air interface, which in turn lessens the need to keep a radio element of the mobile device on. A mobile device's battery performance no longer needs to depend upon a network air interface configuration. Service operators can also keep optimizing network parameters for the best speech call performance instead of being burdened with the transmission and receipt of keep-alive messages. In addition, keep-alive functionality that resides outside of the mobile device also simplifies the task of application developers and makes applications more "future-proof" and independent upon multiple access methods. Furthermore, managing future networks and configurations in different countries need not be the responsibility of application developers any longer, but rather the responsibility of network operators and platform providers.

It should further be noted that client originated, keep-alive messages are desirable when connecting to existing application servers, requiring no changes to the servers. However, if the application server is aware of mobile networks and the keep alive functionality, using server-originated keep alive messages, where the server can comprise, but is not limited to, an application server, a GGSN, or a Home Agent as described above, would enable changing the keep alive behavior without updating the clients.

The present invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method comprising:
providing a keep-alive application programming interface on a device configured to connect to an application client;
transmitting one or more messages of a first keep-alive message type from the device;
determining keep-alive parameters via the keep-alive application programming interface;
transmitting, to a network element via the keep-alive application programming interface, data comprising the keep-alive parameters and information identifying one or more types of keep-alive messages such that the network element is instructed to transmit the one or more types of keep-alive messages to an application server on behalf of the device;
receiving, by the device, information from the network element that directs the device to stop transmitting the one or more types of keep-alive messages to the network element, wherein the information that directs the device to stop transmitting the one or more types of the keep-alive messages to the network element directs the device to stop transmitting the first keep-alive message type;

determining that an outgoing message is one of the one or more types of keep-alive messages that the device is to stop transmitting to the network element; and filtering, by the device, the outgoing message from outgoing traffic of the device.

2. The method of claim 1, wherein the keep-alive parameters include a message sending period, at least one parameter defining message content, and a target IP address of the application server.

3. The method of claim 1, further comprising: prior to transmitting the data, determining, by the keep-alive application programming interface, whether a network element-based keep-alive messaging service exists in a network in which the application client operates.

4. The method of claim 3, further comprising: upon determining that a network element-based keep-alive messaging service does not exist in the network, transmitting, by the device, a first keep-alive message to the application server.

5. The method of claim 1, wherein the keep-alive application programming interface comprises a filter description for defining that the one or more types of the keep-alive messages are not to be forwarded from the device.

6. The method of claim 5, wherein the filtering is performed based on the filter description.

7. The method of claim 1, wherein the information that directs the device to stop transmitting the one or more types of the keep-alive messages to the network element directs the device to stop transmitting each of a plurality of message types of keep-alive messages.

8. The method of claim 1, wherein the keep-alive application programming interface does not receive requests for keep-alive functions from the application server while the device is connected to the application server.

9. The method of claim 1, further comprising: performing a query to determine whether network-element-based keep-alive messaging functionality is available.

10. The method of claim 9, wherein the transmitting of the data is part of a negotiating process with the network element to relieve the device of a duty to perform keep-alive messaging.

11. The method of claim 1, wherein the network element is a GPRS gateway serving node.

12. The method of claim 1, wherein the network element is interposed between the device and the application server.

13. The method of claim 12, further comprising:
upon determining an IP address of the network element during a dynamic host configuration protocol procedure, requesting, by the device, network address translation-based keep-alive messaging from the network element.

14. An apparatus comprising:
a processor; and
a memory storing computer executable instructions that, when executed, cause the apparatus to at least:
provide a keep-alive application programming interface that is configured to connect to an application client;
transmit one or more messages of a first keep-alive message type;
determine keep-alive parameters via the keep-alive application programming interface;
transmit, to a network element via the application programming interface, data comprising the keep-alive parameters and information identifying one or more types of keep-alive messages such that the network element is instructed to transmit the one or more types of keep-alive messages to an application server on behalf of the apparatus;
receive information from the network element that directs the apparatus to stop transmitting the one or more types of keep-alive messages to the network element, wherein the information that directs the apparatus to stop transmitting the one or more types of the keep-alive messages to the network element directs the apparatus to stop transmitting the first keep-alive message type;
determine that an outgoing message is one of the one or more types of keep-alive messages that the apparatus is to stop transmitting to the network element; and
filter the outgoing message from outgoing traffic of the apparatus.

15. The apparatus of claim 14, wherein the keep-alive parameters include a message sending period, at least one parameter defining message content, and a target IP address of the application server.

16. The apparatus of claim 14, wherein the memory further stores computer executable instructions that, when executed, cause the apparatus to: prior to transmitting the data, determine, by the keep-alive application programming interface, whether a network element-based keep-alive messaging service exists in a network in which the apparatus operates.

17. The apparatus of claim 16, wherein the memory further stores computer executable instructions that, when executed, cause the apparatus to: upon determining that a network element-based keep-alive messaging service does not exist in the network, transmit a first keep-alive message to the application server.

18. The apparatus of claim 14, wherein the keep-alive application programming interface comprises a filter description for defining that the one or more types of keep-alive messages are not to be forwarded from the apparatus.

19. The apparatus of claim 18, wherein the filtering is performed based on the filter description.

20. The apparatus of claim 14, wherein the network element is a GPRS gateway serving node.

21. The apparatus of claim 14, wherein the memory further stores computer executable instructions that, when executed, cause the apparatus to: upon determining an IP address of the network element during a dynamic host configuration protocol procedure, request network address translation-based keep-alive messaging from the network element.

22. A memory comprising computer executable instructions that, when executed, cause a device to at least:
provide a keep-alive application programming interface on the device configured to connect to an application client;
transmit one or more messages of a first keep-alive message type from the device;
determine keep-alive parameters via the application programming interface;
transmit, to a network element via the application programming interface, data comprising the keep-alive parameters and information identifying one or more types of keep-alive messages such that the network element is instructed to transmit the one or more types of keep-alive messages to an application server on behalf of the device;
receive, by the device, information from the network element that directs the device to stop transmitting the one or more types of keep-alive messages to the network element, wherein the information that directs the device to stop transmitting the one or more types of the keep-alive messages to the network element directs the device to stop transmitting the first keep-alive message type;

determine that an outgoing message is one of the one or more types of keep-alive messages that the device is to stop transmitting to the network element; and filter, by the device, the outgoing message from outgoing traffic of the device.

\* \* \* \* \*